(12) United States Patent
Hein

(10) Patent No.: US 8,097,668 B2
(45) Date of Patent: Jan. 17, 2012

(54) COLORIMETRIC INDICATOR OF RADIATION EXPOSURE

(75) Inventor: Christopher L. Hein, Evansville, IN (US)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 388 days.

(21) Appl. No.: 11/845,232

(22) Filed: Aug. 27, 2007

(65) Prior Publication Data

US 2009/0062424 A1 Mar. 5, 2009

(51) Int. Cl.
 *C08K 5/23* (2006.01)
 *C08K 5/3447* (2006.01)
 *C08K 5/3465* (2006.01)

(52) U.S. Cl. .............. 524/89; 524/87; 524/90; 524/190; 524/305; 523/135; 106/287.21; 106/287.23; 106/498; 106/505

(58) Field of Classification Search .................. 524/87, 524/190, 305, 89, 90; 523/135; 106/287.21, 106/287.23, 498, 505
See application file for complete search history.

(56) References Cited

U.S. PATENT DOCUMENTS

| 3,743,846 A | 7/1973 | Matsumoto et al. |
| 5,028,792 A | 7/1991 | Mullis |
| 6,197,723 B1 * | 3/2001 | Gotoh ........................ 503/201 |
| 6,355,723 B1 * | 3/2002 | van Baal et al. ............. 524/602 |
| 6,504,161 B1 * | 1/2003 | Jackson et al. ............. 250/474.1 |
| 7,029,502 B2 | 4/2006 | Clement et al. |
| 2007/0135569 A1 * | 6/2007 | DeRudder ....................... 525/67 |
| 2008/0220353 A1 * | 9/2008 | Dontula et al. ................. 430/61 |

* cited by examiner

*Primary Examiner* — Kriellion Sanders
(74) *Attorney, Agent, or Firm* — Michael Best & Friedrich LLP; Paul A. Jenny; Todd S. Hofmeister

(57) ABSTRACT

A colorimetric composition is disclosed comprising a polycarbonate resin, a dye, and a thiopropionate. The composition undergoes an irreversible color shift to a darker color upon exposure to sunlight or UV radiation. Processes for producing and/or using such a colorimetric composition are also disclosed.

20 Claims, 3 Drawing Sheets

COLORIMETRIC INDICATOR OF RADIATION EXPOSURE

BACKGROUND

The present disclosure generally relates to a calorimetric composition. The colorimetric composition is an indicator of exposure to light, and in particular, ultraviolet radiation ("UV"). Also disclosed are methods for preparing and using the same.

Plastic, polymeric, or elastomeric components are a part of everyday life. However, these materials are susceptible to degradation when exposed to the elements of light, water, and oxygen. For example, outdoor exposure of plastic resins may lead to embrittlement and cracking. When oxidation due to photochemical processes occurs in the polymer, chemical bonds break and the polymer begins losing molecular weight. If not chosen and used correctly, some plastic materials will degrade and lose their mechanical properties. When a failure occurs, it can be dangerous and costly.

As a result, it is recognized that outdoor exposure to large amounts of sunlight radiation may cause problems and that such exposure should be monitored. For example, polyethylene tanks are routinely used for bulk chemical storage outdoors. General safety guidelines call for inspection after several years of service for crazing, cracking, and discoloration. One suggested method of monitoring the integrity off such polyethylene tanks involves treating a small area with a colored dye, then watching for voids, formed as a result of photochemical degradation, to take up the dye.

Additionally, in order to minimize the deleterious effects of sunlight to these tanks, polyethylene can be stabilized to a certain degree. This is done with either UV absorbers and hindered amine light stabilizers (HALS) or high loadings of carbon black (3%). For example, UV absorbers are substances that absorb UV radiation energy, then dissipate the energy in a harmless form. They are used in plastics and rubbers to decrease light sensitivity. Hindered amines and carbon black can also be utilized to stabilize polymers against sunlight.

Furthermore, a United Nations report outlined a proposal to mitigate the risk of UV exposure of plastics or polymers commonly used in Intermediate Bulk Containers (IBCs). It was recognized that cumulative exposure to sunlight can reduce the strength of such containers which may be used to transport dangerous goods. An elaborate coding system was proposed to guide users on how certain plastics or polymers should be labeled and transported in an effort to minimize outdoor exposure.

Another area of failure of plastics or polymers in the field involves warranties established by original equipment manufacturers ("OEMs") of such components. Some resins are designed for outdoors use while others are not. However, these unstable and unsuitable resins are often used in outdoor settings anyways. Manufacturers of outdoor equipment may void the warranty if the parts are exposed to excessive sunlight.

Accordingly, an easy and reliable method of inspecting warranty claims and performing preventive maintenance is needed. Radiometers could solve some of the outlined problems, but are expensive and fragile. A simple calorimetric approach would aid inspections and facilitate product reviews by test organizations.

A composition is needed which, upon exposure to UV light, forms a chromophore that is stable with respect to continued UV exposure, quantifiable, and/or cost effective. The composition could be used as a colorimetric indicator of sunlight exposure.

Several articles have been designed to indicate sunlight exposure, but they generally focus on short-term exposure. These systems usually involve Bronsted acid-base reactions where an acid-sensitive dye is protonated and changes through multiple colors within a short period of time, e.g. 60 minutes, as in U.S. Pat. No. 5,028,792. These systems are not known to be lightfast, so retention of the long-term exposure information is lacking. Other systems rely on the photochemical degradation of a chlorine-containing polymer to produce acid, followed by protonation of an acid-sensitive dye, as in U.S. Pat. No. 3,743,846. This system operates when exposed to gamma rays or electron rays. Additional examples rely on an organic halogen to produce acid necessary for dye protonation and a subsequent color shift. These systems are used as UVB sensors for short-term exposure, as in U.S. Pat. No. 6,504,161.

It would be desirable to produce a new composition which can provide an indication of exposure to sunlight or to UV radiation, such as for use under long term exposure.

BRIEF DESCRIPTION

Disclosed, in various embodiments, is a composition useful for indicating sunlight or UV radiation exposure. Also disclosed are processes for producing and/or using the same.

In the embodiments, the colorimetric composition comprises a polycarbonate resin; a dye; and a thiopropionate.

The dye may be selected from the group consisting of azo dyes and carbonyl-containing dyes. The carbonyl-containing dye may be selected from the group consisting of perylene dyes and perinone dyes. The dye may be a solvent dye. The dye may contain no sulfonic acid or carboxylic acid groups.

The carbonyl-containing dye may be a perinone dye of the general formula

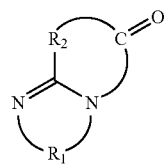

wherein $R_1$ and $R_2$ each complete a ring which may be unfused or fused to another cyclic ring system; wherein any of the rings may be unsubstituted or substituted with hydroxyl, alkyl, alkoxy, alkylcarbonyl, carbonamide, carbalkoxy, cyano, or halogen.

The dye may be present in the amount of from about 0.0001% by weight to about 10% by weight of the composition.

The azo dye may be selected from the group consisting of C.I. Solvent Red 23; C.I. Solvent Red 24; C.I. Solvent Yellow 56; C.I. Solvent Yellow 14; and C.I. Solvent Yellow 16. The carbonyl-containing dye may be selected from the group consisting of C.I. Solvent Orange 60; C.I. Solvent Red 135; C.I. Solvent Red 179; and C.I. Solvent Yellow 104.

The thiopropionate may be pentaerythritol tetrakis(beta-lauryl-thiopropionate). The thiopropionate may be present in the amount of from 0.05% by weight to about 10% by weight of the composition or from 0.05% by weight to about 0.4% by weight.

The composition may have a haze level of 5% or less at a thickness of 3.2 millimeters, as measured by ASTM D1003. The composition may have a light transmittance of 10% or greater at a thickness of 3.2 millimeters, as measured by ASTM D1003.

In other embodiments, a colorimetric composition is disclosed which comprises a polycarbonate resin; a perinone dye; and a thiopropionate.

In other embodiments, a method for monitoring the exposure of an article to sunlight or ultraviolet radiation is provided. The method comprises:

providing a composition comprising a polymeric resin, a dye selected from the group consisting of azo dyes and carbonyl-containing dyes, and a thiopropionate;

associating, affixing, or attaching the composition to the article; and detecting a shift in the color of the composition from an initial color to a darker color, the degree of shift indicating the amount of sunlight or ultraviolet radiation to which the article has been exposed.

The polymeric resin may be a polycarbonate resin and the dye may be a perinone dye.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
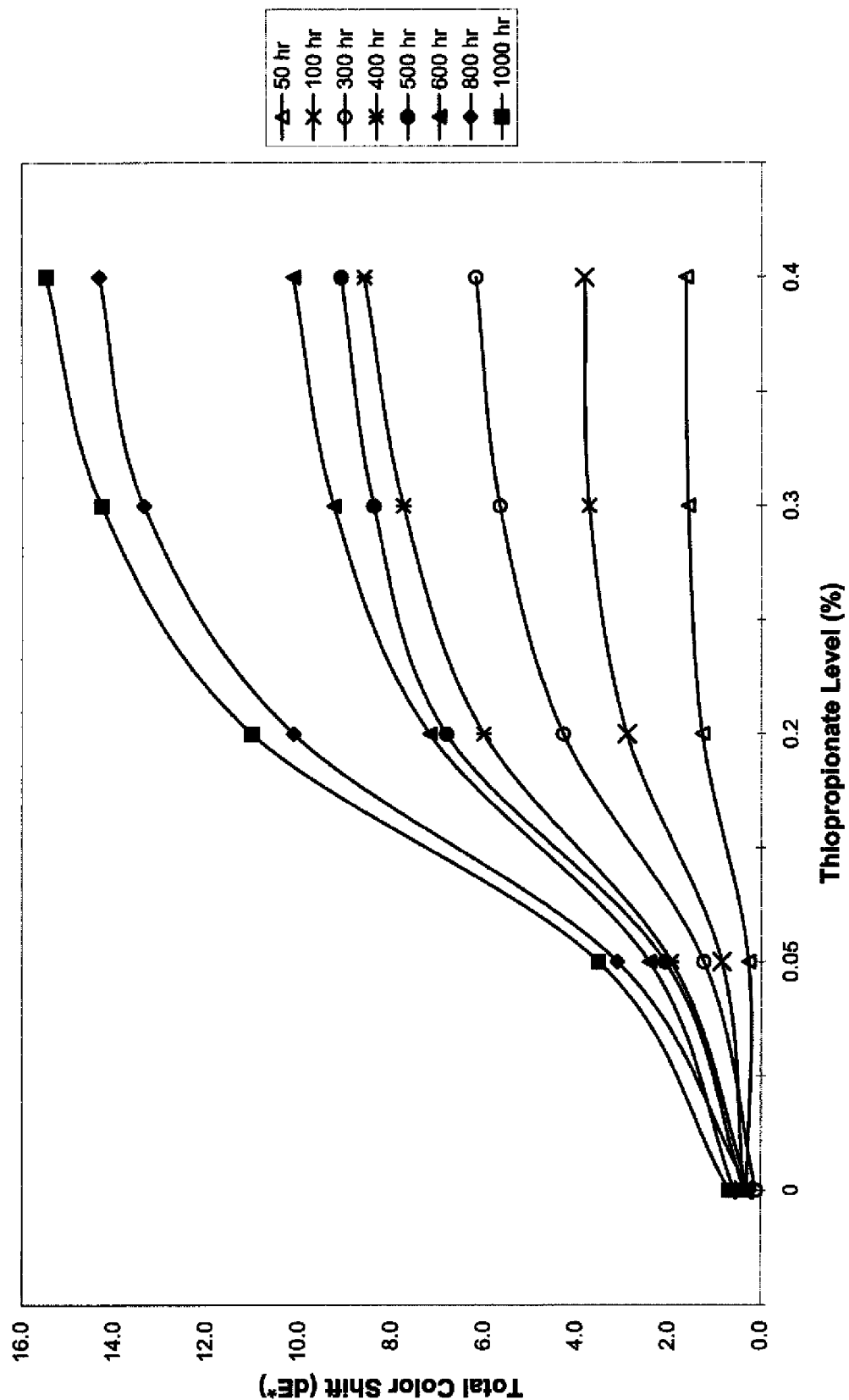
FIG. 1 is a graph showing the effect of time on the strength of the color shift.

A more complete understanding of the components and processes disclosed herein can be obtained by reference to the accompanying drawings. These drawings are merely schematic representations based on convenience and the ease of demonstrating the present disclosure, and are, therefore, not intended to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The calorimetric composition comprises a polymeric resin, a dye selected from the group consisting of azo dyes and carbonyl-containing dyes, and a thiopropionate. It was unexpectedly found that the combination of the dye and the thiopropionate created an irreversible, dark color shift in the composition upon exposure to sunlight or UV radiation.

As used herein, the term "sunlight" refers to the total spectrum of electromagnetic radiation coming from the sun. This total spectrum includes, at a minimum, ultraviolet radiation, visible light, and infrared radiation. The term "ultraviolet radiation" refers to light having a wavelength of from about 1 nanometer to about 400 nanometers. In laboratory tests, sunlight exposure may be simulated by a xenon arc source.

The term "dark" is defined as a relative term in which the final color differs from the initial color and is represented by a decrease in both lightness and chroma. The color shift is considered dark if, when a 0.125 inch thick transparent plaque is measured using CIELab, the dL* is from −1.0 to −20.0 after 1,000 hours exposure according to ASTM G26.

The calorimetric composition comprises a polycarbonate resin. Polycarbonates have several desired properties including clarity or transparency, high impact strength, heat resistance, weather and ozone resistance, good ductility, being combustible but self-extinguishing, good electrical resistance, noncorrosive, nontoxic, etc.

As used herein, the terms "polycarbonate" and "polycarbonate resin" mean compositions having repeating structural carbonate units of the formula (1):

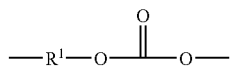

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

$$-A^1-Y^1-A^2 \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

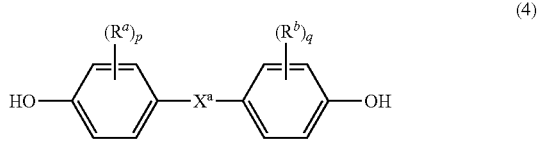

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

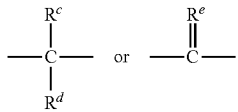

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, C1-12 alkyl, C1-12 alkoxy, or C1-12 acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

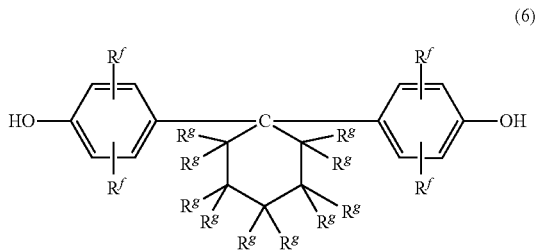

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the Apec® trade name.

Other useful dihydroxy compounds having the formula HO—R1-OH include aromatic dihydroxy compounds of formula (7):

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl) propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In a specific embodiment, the polycarbonate is a linear homopolymer derived from bisphenol-A, in which each of A1 and A2 is p-phenylene and Y1 is isopropylidene. The polycarbonates may have an intrinsic viscosity, as determined in chloroform at 25° C., of from about 0.3 to about 1.5 deciliters per gram (dl/g), specifically from about 0.45 to about 1.0 dl/g. The polycarbonates may have a weight average molecular weight (Mw) of from about 10,000 to about 100,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has a melt volume flow rate (often abbreviated MVR). The MVR measures the rate at which a thermoplastic passes vertically through a capillary under a defined weight load. The MVR is measured in cubic cm per 10 minutes (cc/10 min). Polycarbonates useful for the formation of thin articles may have an MVR, measured at 300° C. under a load of 1.2 kg according to ASTM D1238-04, of from about 0.5 to about 80 cubic centimeters per 10 minutes (cc/10 min). In a specific embodiment, a useful polycarbonate composition has an MVR measured at 300° C. under a load of 1.2 kg according to ASTM D1238-04, of from about 0.5 to about 50 cc/10 min, specifically from about 0.5 to about 25 cc/10 min, and more specifically from about 1 to about 15 cc/10 min. Mixtures of polycarbonates of different flow properties may be used to achieve the overall desired flow property.

"Polycarbonates" and "polycarbonate resins" as used herein further include homopolycarbonates, copolymers comprising different R1 moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), repeating units of formula (8):

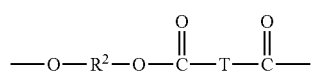 (8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻ a $C_{1-8}$ alkoxy group or a $C_{6-18}$ aryloxy group. An effective amount of a phase transfer catalyst may be about 0.1% by weight to about 10% by weight based on the weight of bisphenol in the phosgenation mixture. In another embodiment an effective amount of phase transfer catalyst may be about 0.5% by weight to about 2% by weight based on the weight of bisphenol in the phosgenation mixture.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1'-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents may be added at a level of about 0.05% by weight to about 2.0% by weight. Mixtures comprising linear polycarbonates and branched polycarbonates may be used.

A chain stopper (also referred to as a capping agent) may be included during polymerization. The chain stopper controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Melt processes are generally carried out in a series of stirred tank reactors. The reaction can be carried out by either a batch mode or a continuous mode. The apparatus in which the reaction is carried out can be any suitable tank, tube, or column. Continuous processes usually involve the use of one or more continuous-stirred tank reactors (CSTRs) and one or more finishing reactors.

Polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)]ester, or a combination comprising at least one of these. Also contemplated are aromatic polyesters with a minor amount, e.g., about 0.5% by weight to about 10% by weight, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly (cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

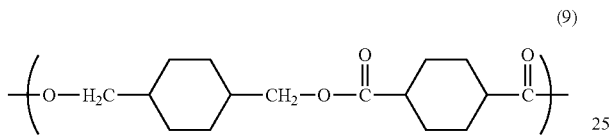

(9)

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polyester-polycarbonates may have a weight-averaged molecular weight ($M_w$) of from about 1,500 to about 100,000, specifically from about 1,700 to about 50,000, and more specifically from about 2,000 to about 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Where used, it is desirable for a polyester-polycarbonate to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name Xylex®, including for example Xylex® X7300, and commercial polyester-polycarbonates are marketed under the tradename Lexan® SLX polymers, including for example Lexan® SLX-9000, and are available from GE Plastics.

The polycarbonate may be a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (10):

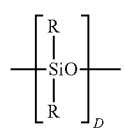

(10)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the polymer, the desired properties of the polymer, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

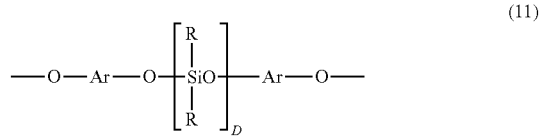

(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

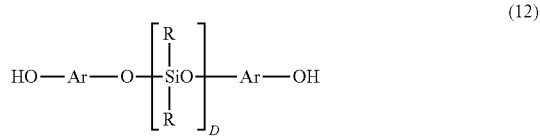

(12)

wherein R, Ar, and D are as described above. Compounds of formula (12) may be obtained by the reaction of a dihydroxyarylene compound with, for example, an alpha, omega-bisacetoxypolydiorganosiloxane under phase transfer conditions.

In another embodiment, polydiorganosiloxane blocks comprise units of formula (13):

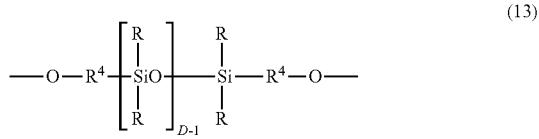

(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

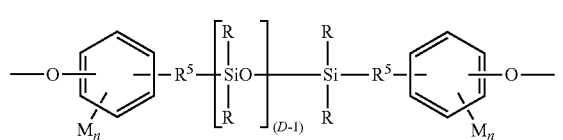

(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

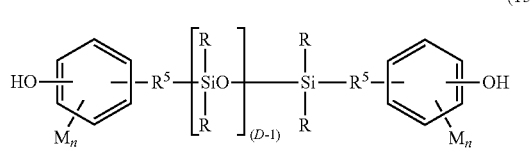

(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In an embodiment, the polysiloxane-polycarbonate may comprise polysiloxane units, and carbonate units derived from bisphenol-A, e.g., the dihydroxy compound of formula (3) in which each of A1 and A2 is p-phenylene and Y1 is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property. In an embodiment, exemplary polysiloxane-polycarbonates are marketed under the trade name Lexan® EXL polycarbonates, available from GE Plastics.

The polycarbonate resin may be transparent or opaque. The polycarbonate resin may generally be any initial color. However, because the color of the colorimetric composition shifts to a dark color upon exposure, the polycarbonate resin should not be black or dark brown. Otherwise, the color shift may not be visible.

The colorimetric composition further comprises a dye selected from the group consisting of azo dyes and carbonyl-containing dyes. The carbonyl-containing dye contains at least one carbonyl (—CO—) group. In specific embodiments, the dye is a solvent dye, i.e. a dye that is soluble in a solvent, but not soluble in water. In particular embodiments, the dye contains no sulfonic acid or carboxylic acid groups. In specific embodiments, the dye is a solvent dye which contains no sulfonic acid or carboxylic acid groups.

In addition, the dye should be lightfast, i.e., the initial color will not fade upon exposure to light. In embodiments, the dye is present in the amount of from about 0.0001% by weight to about 10% by weight of the colorimetric composition.

In some embodiments, the dye is an azo dye. Azo dyes have as part of their structure an azo (—N=N—) group.

In other embodiments, the dye is selected from perylene dyes and perinone dyes. Perylene dyes are derived from or have as part of their structure the general formula:

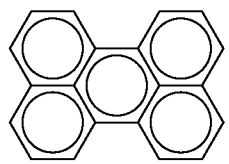

to which various carbonyl-containing groups, such as carboxylic acid groups, are added.

Perinone dyes have the general formula:

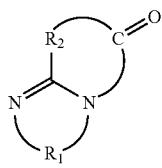

wherein $R_1$ and $R_2$ each complete a ring which may be unfused or fused to another cyclic ring system; wherein any of the rings may be unsubstituted or substituted with hydroxyl, alkyl, alkoxy, alkylcarbonyl, carbonamide, carbalkoxy, cyano, or halogen. The $R_2$ notation should be construed as representing the other atoms in the ring comprising the carbonyl carbon, the single-bond nitrogen atom, and the carbon atom bonded to two nitrogen atoms. In other words, the notation should not be construed as requiring the carbonyl carbon to be adjacent to the single-bond nitrogen atom in the ring containing $R_2$. In further embodiments, $R_1$ completes a six-membered ring which is fused to another naphthalene ring system. In further embodiments, $R_2$ completes either a five-membered or six-membered ring, which is fused to another cyclic ring system.

In specific embodiments, the dye is an azo dye selected from C.I. Solvent Red 23 (CAS# 85-86-9), C.I. Solvent Red 24 (CAS# 85-83-6), C.I. Solvent Yellow 56 (CAS# 2481-94-9), C.I. Solvent Yellow 14 (CAS# 842-07-9), and C.I. Solvent Yellow 16 (CAS# 4314-14-1). Their chemical structures are shown below:

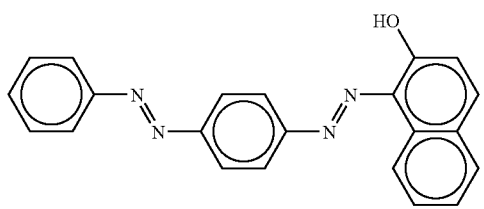

Solvent Red 23

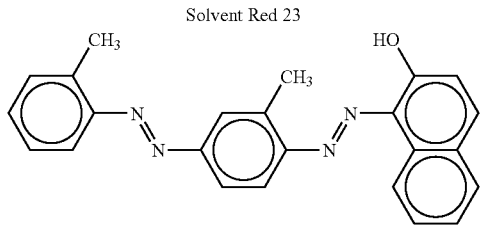

Solvent Red 24

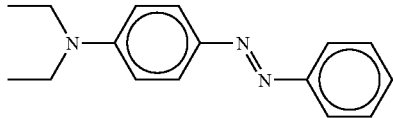

Solvent Yellow 56

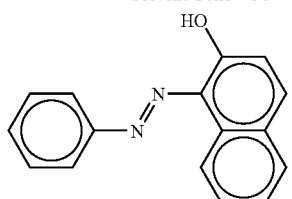

Solvent Yellow 14

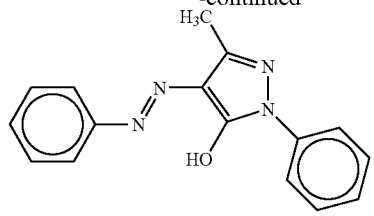

Solvent Yellow 16

The azo dye may also be that of the formula:

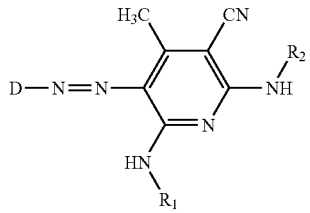

wherein D is a substituted or unsubstituted benzene, naphthalene, diphenyl, thiophene, benzothiazole, benzisothiazole, thiadiazole, indazole, benzotriazole, pyrazole, anthraquinone, naphthalic acid imide, chromone, phthalimide or diphenylene oxide; $R_1$ is unsubstituted or substituted aryl; and $R_2$ is unsubstituted or substituted aryl. Such dyes are described in U.S. Pat. No. 7,029,502, the disclosure of which is hereby fully incorporated by reference.

In specific embodiments, the carbonyl-containing dye is a perinone dye selected from C.I. Solvent Orange 60 (CAS# 61969-47-9), C.I. Solvent Red 135 (CAS # 20749-68-2), C.I. Solvent Red 179, and C.I. Solvent Yellow 104 (CAS # 68296-59-3). Their chemical structures are shown below:

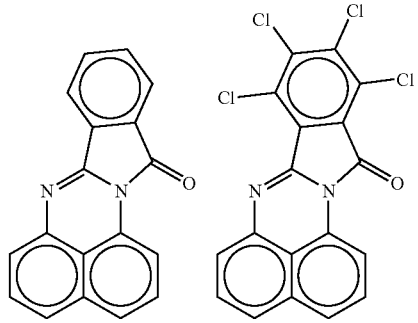

Solvent Orange 60      Solvent Red 135

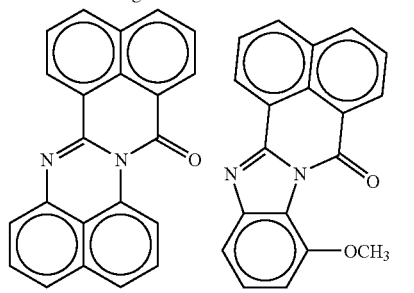

Solvent Red 179      Solvent Yellow 104

Because a visible shift to a dark color occurs upon exposure to UV light, the initial color of the colorimetric composition itself should not be dark. Put another way, the initial color should be light enough that the color shift can be detected. The initial color of the colorimetric composition may be, for example, red, orange, yellow, green, or blue.

The colorimetric composition further comprises a thiopropionate. In some embodiments, thiopropionates have the general formula

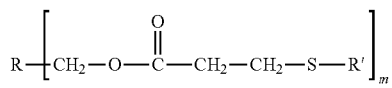

wherein R and R' are independently selected from alkyl having from 1 to about 20 carbon atoms; and m is an integer from 1 to about 4. In specific embodiments, the thiopropionate is pentaerythritol tetrakis(betalaurylthiopropionate), also known as Seenox™ 412S and available from several sources. Thiopropionates are generally known for use as heat stabilizers in rubbers and as antioxidants. The thiopropionate may be present in the amount of from 0.05% by weight to about 10% by weight of the calorimetric composition. In more specific embodiments, the thiopropionate may be present in the amount of from 0.05% by weight to about 0.4% by weight.

The ratio of dye to thiopropionate can affect the color shift. A large ratio of dye:thiopropionate gives reduced dark shift, allowing for better measurement of long term exposure. A low dye:thiopropionate ratio is better for measuring short term exposure because the color shift occurs faster and more strongly.

When exposed to sunlight or ultraviolet radiation, the combination of the thiopropionate and the dye unexpectedly causes an irreversible color shift from a transparent or nearly-transparent color to a dark color. The irreversible color shift also preserves information about the amount of radiant energy to which the colorimetric composition has been exposed, unlike systems where the color shift is reversible. The color shift is gradual and generally corresponds to the amount of sunlight to which the composition has been exposed. The color also shifts to only one color upon exposure and does not switch to a second color with additional exposure, for example light orange to dark orange. The colored species that develops upon UV exposure should also be lightfast. The amount of exposure needed to cause the color shift can be controlled by changing the thiopropionate loading and/or dye loading. The color shift is suitable for measuring exposures of at least from about 50 hours to about 1000 hours of ASTM G26 exposure This color shift effect in the combination of the dye and the thiopropionate was unexpected. Because the dye is generally lightfast and commonly used in weatherable applications, it was not expected to change color at all regardless of whatever other compounds were added to the polymeric resin. However, the presence of the thiopropionate apparently led to photochemically-induced changes in the chromophore, causing the color shift.

The color shift effect occurs largely independent of humidity. To rule out a hydrolytic-based color shift, plaques of the calorimetric composition were placed in a hydro-aging oven for 500 hrs at 80° C. and 80% relative humidity. No color shift was observed.

The amounts of the dye and the thiopropionate are generally selected so as to maintain the transparency of the polycarbonate resin. In embodiments, the colorimetric composition has a haze level less than or equal to 5%, as measured by ASTM D1003. The composition may also have a light transmittance equal to or greater than 10%, as measured by ASTM D1003. In more specific embodiments, the light transmittance is 20% or greater, or 50% or greater.

The colorimetric composition is generally clear. However, if desired, the colorimetric composition may further comprise an additional colorant to change its color. The colorant may be any dye, pigment, or quantum dot which imparts color to the composition and does not adversely affect the color-changing properties of the colorimeteric composition. Useful organic pigments and dyes for imparting color may include acridine dyes, aminoketone dyes, anthracene derivatives, anthraquinones, aryl- or heteroaryl-substituted poly ($C_{2-8}$) olefin dyes, arylmethane dyes, azine dyes, azo dyes, azo lakes, azos, lactone dyes, lanthanide chelates, metal dithiol complexes, methine dyes, perinones, perylenes, phthalocyanines, polyazaindacenes, porphyrin dyes, pyrazolines, pyrazolones, pyrene, pyrilium, quinacridones, quinophthalones, and tetrachloroisoindolinones.

The colorimetric composition may further include other additives which can be incorporated with polymeric compositions, with the proviso that the additives are selected so as not to adversely affect the desired properties of the colorimetric composition. Mixtures of additives may be used. Such additives may be mixed at a suitable time during the mixing of the components for forming the thermoplastic composition. Examples of such additives include antioxidants, heat stabilizers, light stabilizers, UV absorbers, plasticizers, mold release agents, lubricants, antistatic agents, flame retardants, and anti-drip agents. Types of stabilizers include HALS and UV absorbers such as benzotriazoles, benzophenones, cyanoacrylates, triazines, formamidines, and oxalanilides.

Thermal stabilizers may be optionally added to the composition to prevent degradation of the organic polymer during processing and to improve heat stability of the article. Suitable thermal stabilizers include phosphites, phosphonites, phosphines, hindered amines, hydroxylamines, phenols, acryloyl modified phenols, hydroperoxide decomposers, benzofuranone derivatives, or the like, or combinations comprising at least one of the foregoing thermal stabilizers. Preferred thermal stabilizers are phosphites.

The colorimetric composition may be used to monitor exposure of an article to sunlight or ultraviolet radiation, such as from a xenon source, carbon arc, or fluorescent light source. The article can be molded from the composition or a small patch made from the composition can be affixed to the article. The color shift operates as a visual warning to the user, who then removes the article from sunlight and replaces it before cracks develop. Alternatively, a testing organization would have instrumental and visual proof that an article was exposed when guidelines direct consumers to avoid exposing plastic or polymeric articles to sunlight or UV light. Other uses include in a tamper evident article to show that exposure to sunlight or UV light has occurred and in products intended for temporary outdoor use, such as for a trial period of time.

As dark colors usually lighten upon prolonged exposure to sunlight or UV light, the calorimetric composition (which darkens upon exposure to sunlight or UV light) may also be used as an agent to offset the deterioration of the dark color. The colorimetric composition may thus be used as a color compensator.

The colorimetric compositions of the present disclosure may be manufactured by methods generally available in the art. For example, in one manner of proceeding, the polycarbonate resin, dye, and thiopropionate are first blended in a high speed mixer. Other low shear processes including, but not limited to, hand mixing may also accomplish this blending. The blend is then fed into the throat of an extruder via a hopper. Alternatively, the dye and/or thiopropionate may be incorporated into the polycarbonate resin by feeding directly into the extruder at the throat and/or downstream through a sidestuffer. Additives may also be compounded into a masterbatch with a desired polycarbonate resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming. Articles may be molded from the colorimetric composition by a variety of means such as injection molding, extrusion, rotational molding, blow molding and thermoforming. The composition may be used into a solvent cast film.

The following examples are provided to illustrate the colorimetric compositions and methods of the present disclosure. The examples are merely illustrative and are not intended to limit devices made in accordance with the disclosure to the materials, conditions, or process parameters set forth therein.

EXAMPLES

Six different compositions G1-G6 were formulated and tested. The polycarbonate homopolymer PC-A was a high flow Bisphenol-A polycarbonate with a target molecular weight of 21,900 (based on GPC using polycarbonate standards). The polycarbonate homopolymer PC—B was a low flow Bisphenol-A polycarbonate with a target molecular weight of 29,900. A phosphite heat stabilizer was included. Seenox™ 412S was included as the thiopropionate. C.I. Solvent Orange 60 was used for the dye. Table 1 is a table showing the ingredients of compositions G1-G6; the amount of each ingredient is given by weight percent based on the total composition.

TABLE 1

| Ingredient | Unit | G1 | G2 | G3 | G4 | G5 | G6 |
|---|---|---|---|---|---|---|---|
| PC-A | % | 64.54 | 64.84 | 64.79 | 64.64 | 64.54 | 64.44 |
| PC-B | % | 35 | 35 | 35 | 35 | 35 | 35 |
| PHOSPHITE STABILIZER | % | 0.06 | 0.06 | 0.06 | 0.06 | 0.06 | 0.06 |
| SEENOX 412S | % | 0.4 | 0 | 0.05 | 0.2 | 0.3 | 0.4 |
| Solvent Orange 60 | % | 0 | 0.1 | 0.1 | 0.1 | 0.1 | 0.1 |

G1 was a first control containing only the thiopropionate. G2 was a second control containing only the dye. The amount of dye was held constant in G2-G6 and the amount of thiopropionate was varied.

The compositions were formed into samples and exposed to light according to ASTM G26. Transparent plaques were injection molded to a thickness of 0.125 inches. The plaques were exposed to accelerated weathering conditions following the ASTM G26 protocol. The ATLAS weathering device was a Ci65 and exposed samples to cycles of 102 minutes with light and 18 minutes with light and water spray combined. Ci65 had a UV cutoff near 290 nm. At 340 nm, the irradiance level was 0.35 W/m² with 30.2 kJ/24 hours. The set-point black panel temperature was 63° C. and the relative humidity was controlled to approximately 50%. Borosilicate was used for both the inner and outer filters.

The total color shift, CIELab dE*, was measured using a Gretag MacBeth 7000A color spectrophotometer having 10 nanometer resolution. The settings were: UV included, SC1, D65 illuminant, and 10 degree observer. The color shift was measured from 50 to 1000 hours at various intervals. The results are shown in Table 2, where dE* is given as a function of the time and of the thiopropionate amount.

Figure 2:
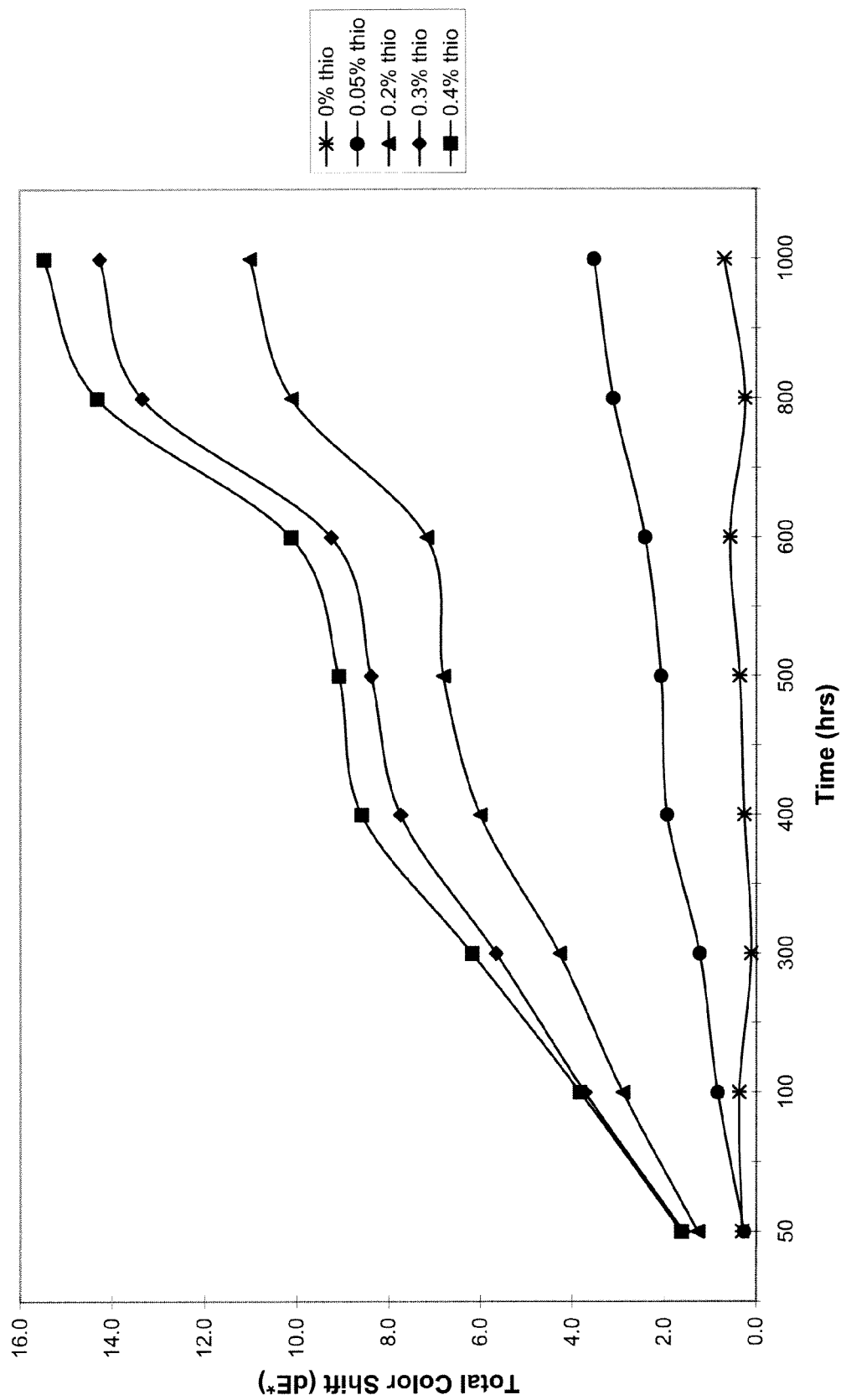
FIG. 2 is a graph showing the color shift over time for a given thiopropionate level.
Figure 3:
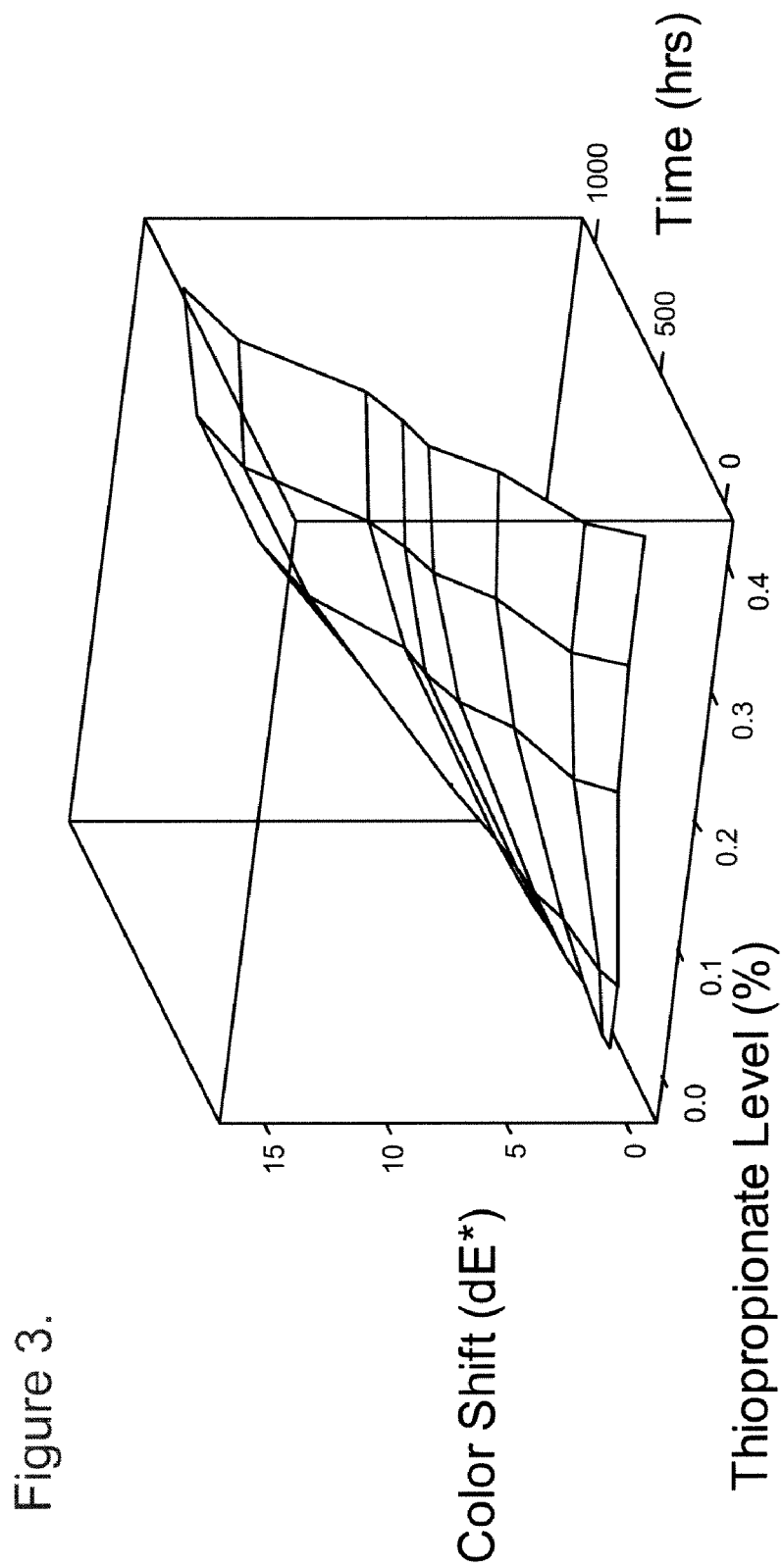
FIG. 3 is a three-dimensional graph showing the color shift over time for a given thiopropionate level.

The data in Table 2 is also shown in FIGS. 1-3. FIG. 1 is a graph showing the effect of time on strength of the color shift. Regardless of the thiopropionate level, the color shift is greater the longer the composition is exposed. FIG. 2 is a graph showing how the color shifts over time at each thiopropionate level. FIG. 3 is a 3-D graph showing how the color shift varies with thiopropionate level and time.

The compositions of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A colorimetric composition comprising:
a polymeric resin;
a dye selected from the group consisting of azo dyes and carbonyl-containing dyes; and
a thiopropionate;
wherein when the dye is an azo dye, the azo dye is selected from C.I. Solvent Red 23; C.I. Solvent Red 24; C.I. Solvent Yellow 56; C.I. Solvent Yellow 14; or C.I. Solvent Yellow 16,
wherein when the dye is a carbonyl-containing dye, the carbonyl-containing dye is selected from C.I. Solvent Orange 60, C.I. Solvent Red 135, C.I. Solvent Red 179, or C.I. Solvent Yellow 104; wherein the colorimetric composition is a blend of the polymeric resin, dye, and the thiopropionate; and
wherein the polymeric resin is transparent and wherein a 0.125 inch thick plaque of the composition is capable of shifting from transparent to a dark color as measured using CIELab, wherein the dL* of the dark color is from −1.0 to −20.0 after 1,000 hours exposure according to ASTMG26.

2. The composition of claim 1, wherein the carbonyl-containing dye is selected from the group consisting of perylene dyes and perinone dyes.

3. The composition of claim 2, wherein the dye is a solvent dye.

4. The composition of claim 1, wherein the dye contains no sulfonic acid or carboxylic acid groups.

5. The composition of claim 1, wherein the dye is present in the amount of from about 0.0001% by weight to about 10% by weight of the composition.

6. The composition of claim 1, wherein the thiopropionate is pentaerythritol tetrakis (betalaurylthiopropionate).

7. The composition of claim 1, wherein the thiopropionate is present in the amount of from 0.05% by weight to about 10% by weight of the composition.

8. The composition of claim 1, wherein the thiopropionate is present in the amount of from 0.05% by weight to about 0.4% by weight of the composition.

TABLE 2

| Sample | Thiopropionate Loading (%) | 50 hrs | 100 hrs | 300 hrs | 400 hrs | 500 hrs | 600 hrs | 800 hrs | 1000 hrs |
|---|---|---|---|---|---|---|---|---|---|
| G2 | 0 | 0.3 | 0.4 | 0.1 | 0.3 | 0.4 | 0.6 | 0.2 | 0.7 |
| G3 | 0.05 | 0.3 | 0.8 | 1.2 | 1.9 | 2.1 | 2.4 | 3.1 | 3.5 |
| G4 | 0.2 | 1.3 | 2.9 | 4.3 | 6.0 | 6.8 | 7.2 | 10.1 | 11.0 |
| G5 | 0.3 | 1.6 | 3.7 | 5.7 | 7.7 | 8.4 | 9.3 | 13.4 | 14.3 |
| G6 | 0.4 | 1.6 | 3.8 | 6.2 | 8.6 | 9.1 | 10.1 | 14.3 | 15.5 |

9. The composition of claim 1, wherein the composition has a haze level of 5% or less at a thickness of 3.2 millimeters, as measured by ASTM D1003.

10. A composition, comprising:
    a polycarbonate resin;
    a perinone dye; and
    a thiopropionate;
    wherein the perinone dye is selected from C.I. Solvent Orange 60, C.I. Solvent Red 135, and C.I. Solvent Red 179, or C.I. Solvent Yellow 104, wherein the composition is a blend of the polycarbonate resin, the perinone dye, and the thiopropionate, wherein the polymeric resin is transparent.

11. The composition of claim 10, wherein the perinone dye is present in the amount of from about 0.0001% by weight to about 10% by weight of the composition.

12. The composition of claim 10, wherein the thiopropionate is pentaerythritol tetrakis(betalaurylthiopropionate).

13. The composition of claim 10, wherein the thiopropionate is present in the amount of from 0.05% by weight to about 10% by weight of the composition.

14. A method for monitoring the exposure of an article to ultraviolet radiation, comprising:
    providing a composition comprising a polycarbonate resin, a dye selected from the group consisting of azo dyes and carbonyl-containing dyes, and a thiopropionate; wherein the composition is a blend of the polycarbonate resin, the dye, and the thiopropionate, and wherein the polymeric resin is transparent;
    associating the composition with an article to be monitored; and
    detecting a shift in the color of the composition from transparency to a darker color as measured by CIELab, wherein a 0.125 inch thick plaque of the composition is capable of shifting to a dark color, wherein the dL* of the dark color is from −1.0 to −20.0 after 1,000 hours exposure according to ASTM G26, the degree of shift indicating the amount of ultraviolet radiation to which the article has been exposed.

15. The method of claim 14, wherein the dye is a perinone dye.

16. The method of claim 14, wherein the associating step is performed by affixing the composition to the article to be monitored.

17. An article comprising the composition of claim 1.

18. The article of claim 17, wherein the composition of claim 1 is affixed to the article.

19. The article of claim 17, wherein the composition of claim 1 is attached to the article.

20. The article of claim 17, wherein the composition is molded.

* * * * *